United States Patent
Weisbrod et al.

(10) Patent No.: US 11,131,548 B2
(45) Date of Patent: Sep. 28, 2021

(54) ROUTING UNMANNED AERIAL VEHICLES BASED ON RADIO FREQUENCY CONDITIONS IN A THREE-DIMENSIONAL ENVIRONMENT

(71) Applicant: Verizon Patent and Licensing Inc., Arlington, VA (US)

(72) Inventors: Fred Weisbrod, Renton, WA (US); Joshua J. Crans, Bothell, WA (US); Corey J. Christopherson, Bainbridge Island, WA (US); Donna L. Polehn, Bellevue, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 241 days.

(21) Appl. No.: 15/914,262

(22) Filed: Mar. 7, 2018

(65) Prior Publication Data
US 2019/0277635 A1   Sep. 12, 2019

(51) Int. Cl.
| | |
|---|---|
| *H04B 17/391* | (2015.01) |
| *G01C 21/00* | (2006.01) |
| *H04B 17/318* | (2015.01) |
| *H04B 17/336* | (2015.01) |
| *H04W 24/10* | (2009.01) |
| *B64C 39/02* | (2006.01) |
| *H04L 29/08* | (2006.01) |

(52) U.S. Cl.
CPC ............ *G01C 21/00* (2013.01); *B64C 39/024* (2013.01); *H04B 17/318* (2015.01); *H04B 17/336* (2015.01); *H04L 67/12* (2013.01); *H04W 24/10* (2013.01); *B64C 2201/141* (2013.01)

(58) Field of Classification Search
CPC . B64C 2201/141; B64C 39/024; G01C 21/00; G01C 21/20; G08G 5/0013; G08G 5/0026; G08G 5/0034; G08G 5/006; G08G 5/0069; H04B 17/318; H04B 17/336; H04B 17/373; H04B 17/391
See application file for complete search history.

(56) References Cited

U.S. PATENT DOCUMENTS

| | | | |
|---|---|---|---|
| 8,948,038 B1* | 2/2015 | Trott | H04W 24/08 370/252 |
| 2009/0213740 A1* | 8/2009 | Ganguly | H04L 41/147 370/252 |
| 2015/0276927 A1* | 10/2015 | Karam | G01S 13/865 342/179 |
| 2018/0004207 A1* | 1/2018 | Michini | G05D 1/0094 |
| 2018/0025500 A1* | 1/2018 | Nielsen | G01S 5/0263 382/103 |
| 2019/0383619 A1* | 12/2019 | Roper | G01B 7/004 |

* cited by examiner

*Primary Examiner* — Hunter B Lonsberry
*Assistant Examiner* — Matthew J. Reda

(57) ABSTRACT

A device can determine a set of parameters associated with generating a route plan for routing an unmanned aerial vehicle (UAV) in a three-dimensional (3D) environment. The set of parameters can include a parameter that identifies a radio frequency (RF) condition to be satisfied by the route plan. The device can determine a route, associated with the 3D environment, based on the parameter that identifies the RF condition and using an RF model. The RF model can be associated with predicting RF conditions in the 3D environment. The device can generate the route plan including information associated with the route. The device can provide information associated with the route plan.

21 Claims, 10 Drawing Sheets

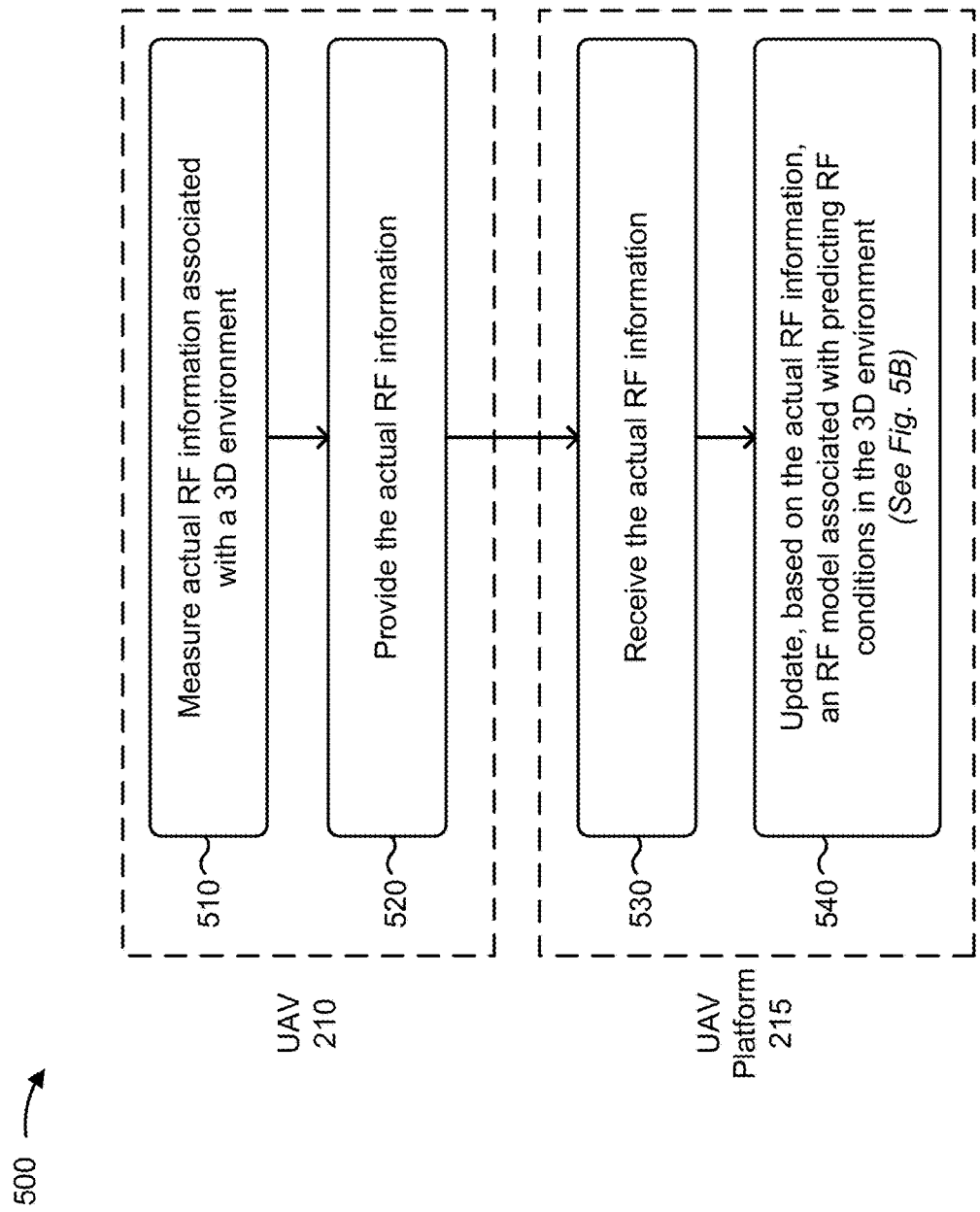

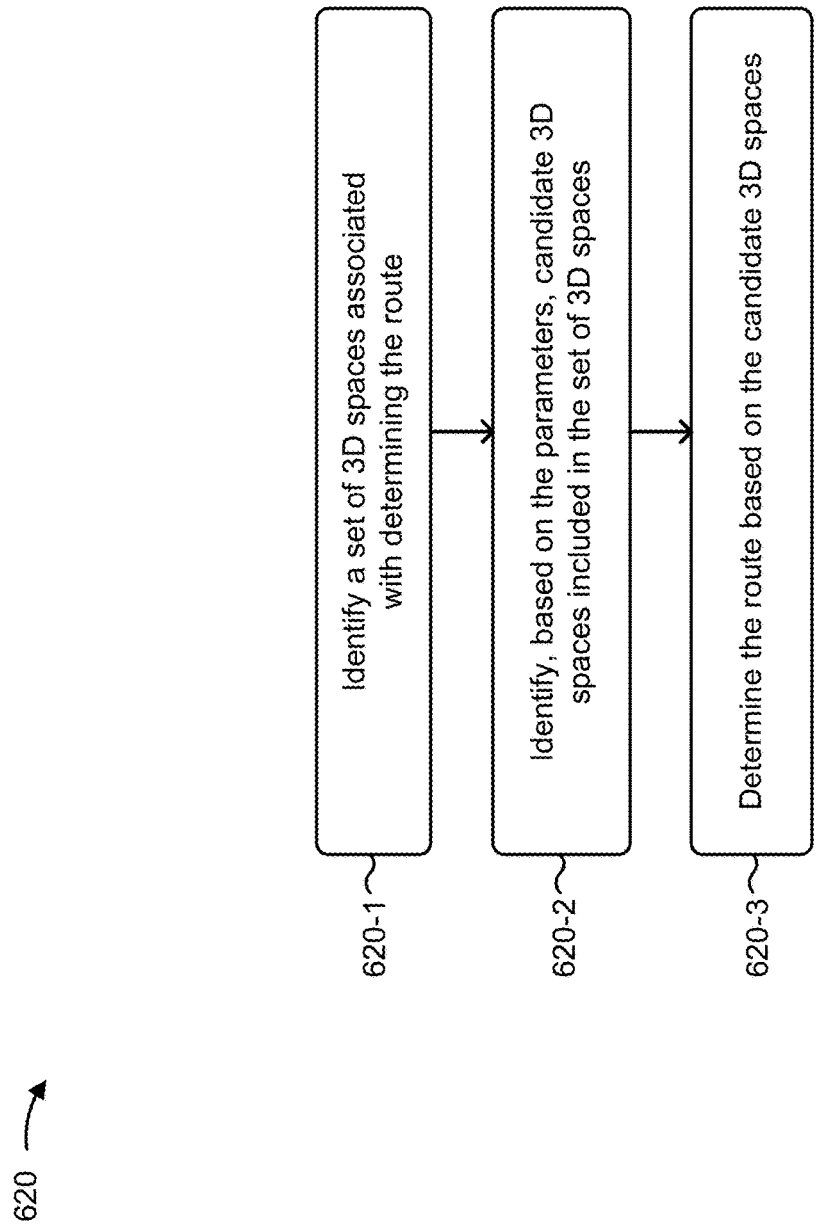

ROUTING UNMANNED AERIAL VEHICLES BASED ON RADIO FREQUENCY CONDITIONS IN A THREE-DIMENSIONAL ENVIRONMENT

BACKGROUND

An unmanned aerial vehicle (UAV) is an aircraft without a human pilot aboard. In some cases, a flight path of the UAV can be controlled autonomously (e.g., by an onboard computer).

BRIEF DESCRIPTION OF THE DRAWINGS

FIGS. 5A and 5B are flows chart associated with an example process for updating an RF model, associated with predicting RF conditions in a 3D environment, based on actual RF information associated with the 3D environment; and FIGS. 6A and 6B are flows chart associated with an example process for generating a route plan using an RF model associated with a 3D environment.

DETAILED DESCRIPTION OF PREFERRED EMBODIMENTS

The following detailed description of example implementations refers to the accompanying drawings. The same reference numbers in different drawings can identify the same or similar elements.

Typical techniques for planning or generating a UAV route (i.e., a flight path) through a 3D environment do not take into account aerial RF conditions within the 3D environment. However, as UAVs become ubiquitous and the number of possible UAV applications increases (e.g., an application in which the UAV can operate beyond visual line of sight operation), RF conditions at altitude need to be known in order to ensure an acceptable level of communication (e.g., fast, reliable, secure, and/or the like) with a UAV while the UAV traverses the route. Conventionally, RF conditions, and the associated coverage maps, are designed with an orientation towards ground level (e.g., in order to provide acceptable RF conditions at ground level rather than at altitude). As such, RF conditions at altitude can be unknown, unpredictable, and/or the like, thereby making it difficult and/or impossible to ensure that the acceptable level of communication can be achieved while a UAV travels at altitude.

Some implementations described herein provide a UAV platform capable of generating an RF model for predicting RF conditions in a 3D environment, and generating a route plan using the RF model. In some implementations, the UAV platform can generate the RF model based on predicted RF information associated with the 3D environment, and can update the RF model (e.g., at a later time) based on actual RF information associated with the 3D environment, as described below. In some implementations, generating the route plan based on the RF model ensures that RF conditions during execution of the route are capable of facilitating an acceptable level of communication with a UAV as the UAV travels at altitude in the 3D environment.

Figure 1A:
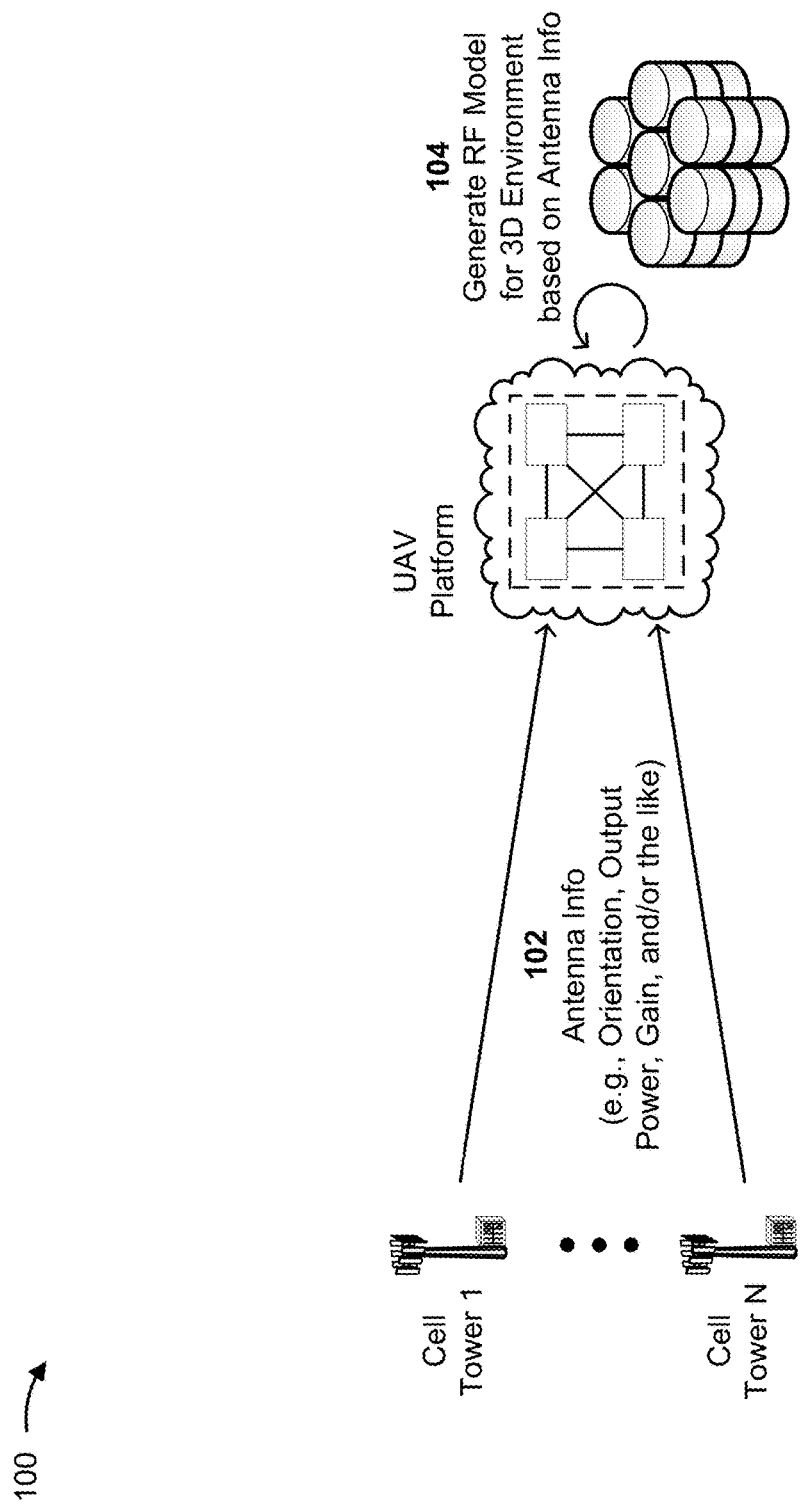
FIGS. 1A-1C are diagrams of an overview of an example implementation described herein.
Figure 1B:
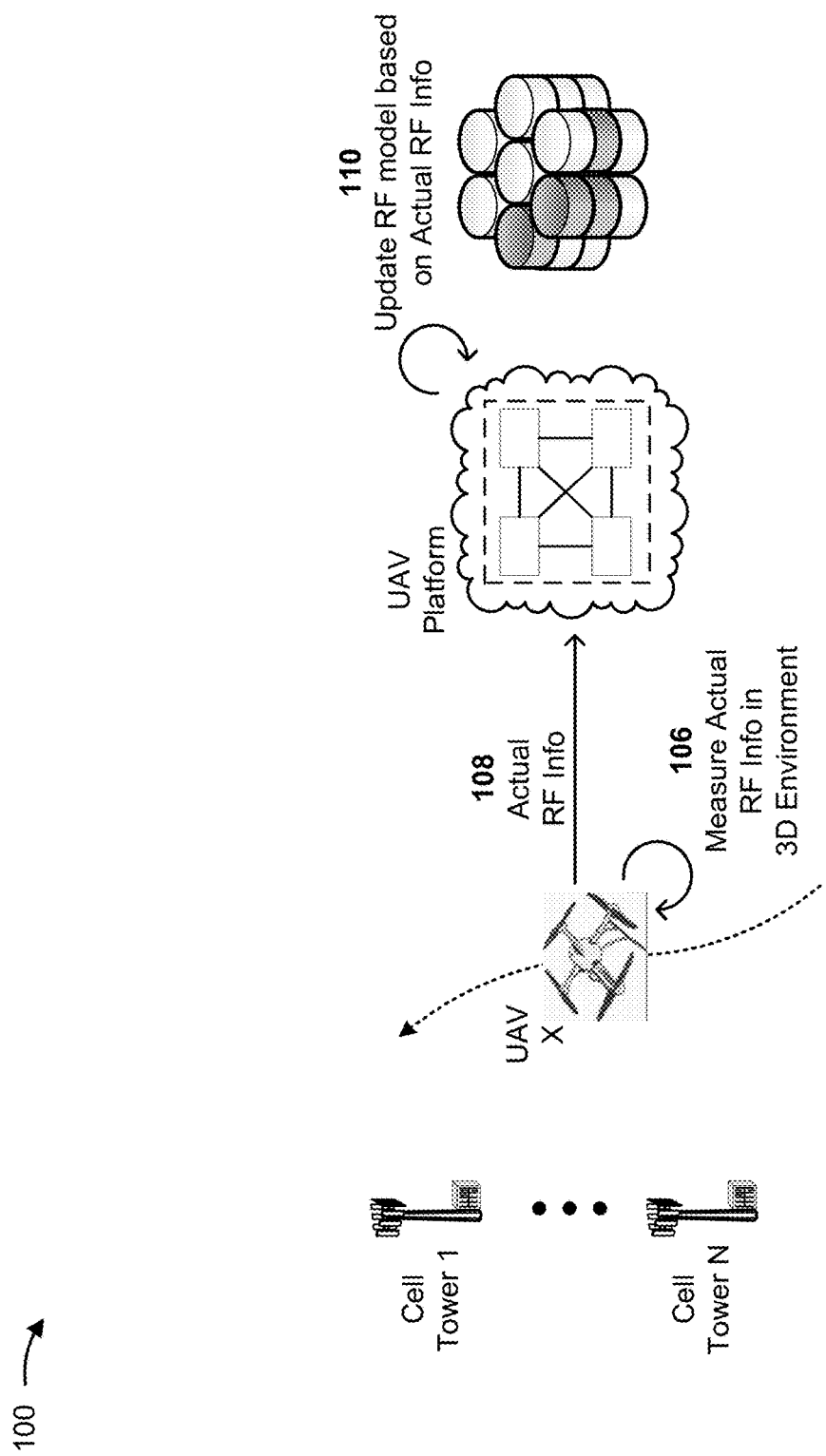
Figure 1C:
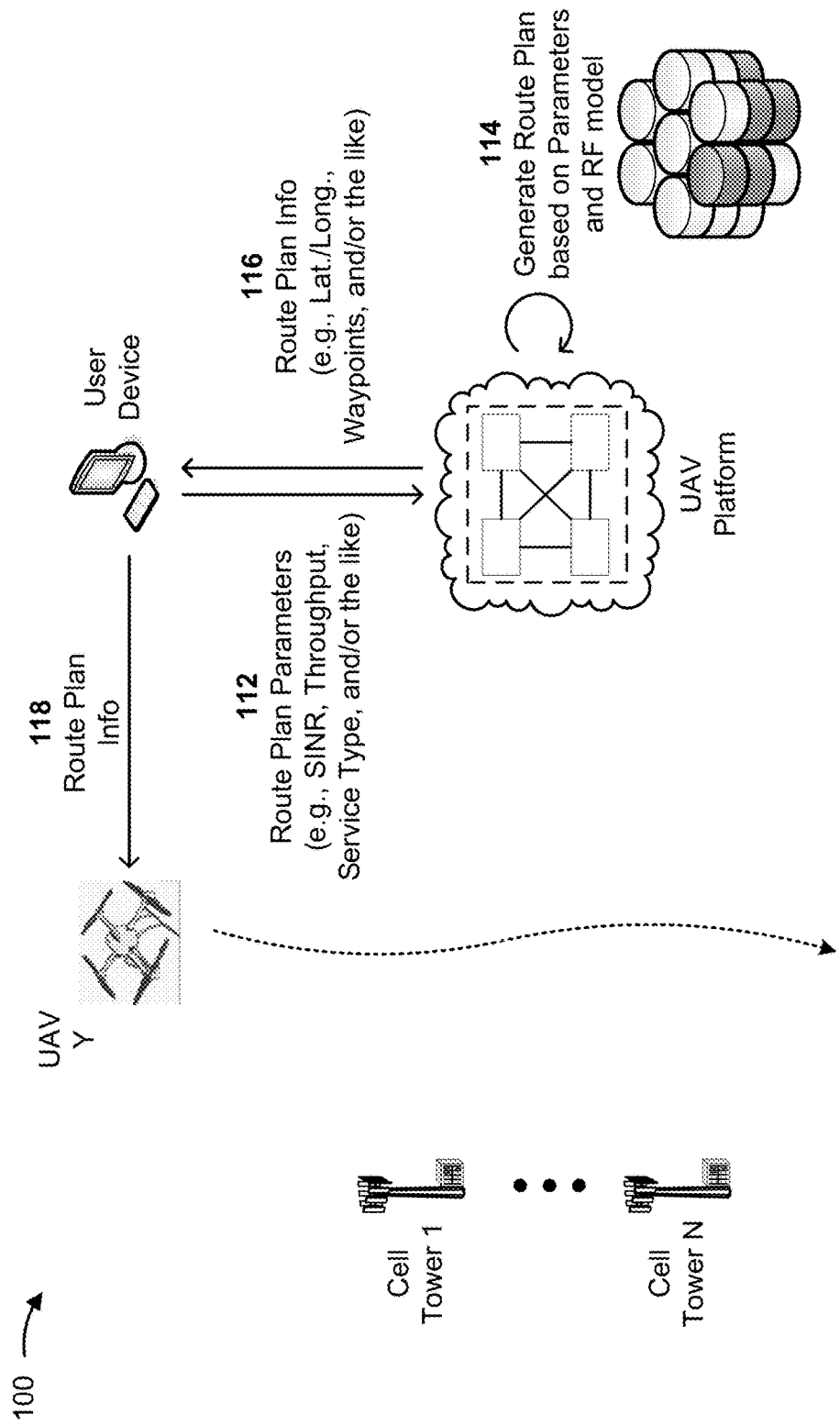

FIGS. 1A-1C are diagrams of an overview of an example implementation 100 described herein.

FIG. 1A is a diagram of an example associated with generating an RF model of a 3D environment. As shown in FIG. 1A, and by reference number 102, a UAV platform can receive, from a network device (e.g., a device that stores and/or manages a centralized network database) antenna information associated with antennas of a group of cell towers (e.g., cell tower 1 through N (N≥1)). The antenna information can include information associated with a property, a characteristic, a configuration, a setting, a parameter, and/or the like of one or more antennas (e.g., antennas of cell towers 1 through N) associated with a 3D environment (e.g., the environment in which UAVs can travel). For example, the antenna information can include information that identifies an antenna, information that identifies a location of the antenna, information that identifies an orientation of the antenna, information that identifies a direction in which one or more RF beams are radiated by the antenna, information that identifies a pattern associated with the antenna, information that identifies a frequency at which the antenna operations, an output power level corresponding to the frequency, and/or the like, as described below.

As shown by reference number 104, the UAV platform can generate a RF model, associated with a 3D environment, based on the antenna information. The RF model can include a model for predicting RF conditions in the 3D environment.

In some implementations, the UAV platform can generate the RF model based on predicted RF information. The predicted RF information can include information that identifies a predicted RF condition within the 3D environment, such as a predicted signal to interference plus noise ratio (SINR), a predicted signal to noise ratio (SNR), a predicted signal strength, a predicted reference signal received power (RSRP), a predicted reference signal received quality (RSRQ), and/or another type of metric that describes a predicted RF condition. In some implementations, a given item of predicted RF information can describe a predicted RF condition in a particular portion of the 3D environment, while the predicted RF information, when taken as a whole, can describe predicted RF conditions throughout the entire 3D environment.

In some implementations, the UAV platform can generate the RF model based on a representation of the 3D environment as stacks of 3D spaces (e.g., shown as cylinders in FIG. 1A), where each 3D space in a given stack corresponds to a different range of altitudes in a particular geographic area. Here, each 3D space can be associated with a respective item of predicted RF information (e.g., such that an item of predicted RF conditions is associated with each of the 3D spaces), as described in further detail below. In this way, the UAV platform can generate an RF model for predicting RF conditions in the 3D environment.

FIG. 1B is a diagram of an example associated with updating the RF model, associated with the 3D environment, based on actual RF information associated with the 3D environment. As shown in FIG. 1B, and by reference number 106, UAV X can measure actual RF information in the 3D environment. The actual RF information can include information that identifies an actual RF condition within the 3D environment, such as an actual SINR at a particular location in the 3D environment, an actual SNR at a particular location in the 3D environment, an actual signal strength at a particular location in the 3D environment, an actual RSRP at a particular location in the 3D environment, an actual RSRQ at a particular location in the 3D environment, and/or another type of metric that describes an actual RF condition at a particular location in the 3D environment. As shown in FIG. 1B, in some implementations, UAV X can measure the actual RF information when UAV X traverses the 3D environment (e.g., while executing a route through the shaded cylinders, associated with the RF model, in FIG. 1B). As shown by reference number 108, UAV X can provide the actual RF information to the UAV platform.

As shown by reference number 110, the UAV platform can update the RF model based on the actual RF information. For example, the UAV 210 can identify predicted RF information, associated with the RF model, the corresponds to the actual RF information (e.g., based on identifying predicted RF information associated with the shaded cylinders shown in FIG. 1B, which correspond to locations at which the actual RF information was measured). Next, the UAV platform can determine adjusted RF information based on the actual RF information and the predicted RF information. The adjusted RF information can include predicted RF information that has been adjusted, updated, or otherwise modified based on actual RF information, as described below.

In this example, the UAV platform can update the RF model by, for example, overwriting predicted RF information with the adjusted RF information. In this way, the UAV platform can update the RF model, associated with the 3D environment, based on actual RF information associated with the 3D environment, which can improve accuracy of the RF model when predicting RF conditions in the 3D environment.

FIG. 1C is a diagram of an example associated with generating a route plan using the RF model. As shown in FIG. 1C, and by reference number 112, the UAV platform can receive parameters based on which the route plan is to be generated. For example, the UAV platform can receive the parameters from a user device, as shown. The parameters can include one or more requirements, factors, guidelines, rules, and/or the like, based on which a route plan is to be generated, such as an RF condition parameter (e.g., a minimum SINR, a minimum SNR, a minimum signal strength, a minimum RSRP, a minimum RSRQ, and/or the like), a throughput parameter, a service type parameter, a routing parameter, a user device parameter, a UAV parameter, a preference-related parameter, an unmanned traffic management (UTM) parameter, a geographical parameter (e.g., information that identifies a maximum altitude, a minimum altitude, a restricted area, an airborne traffic management area, etc.) and/or the like, particular examples of which are provided below.

As shown by reference number 114, the UAV platform can generate the route plan based on the parameters and using the RF model. In some implementations, the UAV platform can generate the route plan by determining one or more routes based on the parameters and the RF model. For example, the UAV platform can identify the set of 3D spaces associated with the RF model (e.g., the 3D spaces for which the RF model can predict RF conditions), identify candidate 3D spaces of the set of the spaces (e.g., 3D spaces with RF conditions that satisfy one or more particular parameters), and determine a route based on the candidate 3D spaces (e.g., using a planning-path algorithm), as described in further detail below. In FIG. 1C, a route determined by the UAV platform is represented by the shaded cylinders associated with the RF model. In some implementations, the UAV platform can determine one or more routes. In some implementations, the UAV platform can determine whether one or more other parameters are satisfied by the determine routes before providing information associated with the route to the user device, as described below.

As shown by reference number 116, the UAV platform can provide information associated with the route plan (e.g., information that identifies sets of latitudes and longitudes, information associated with sets of global positioning system (GPS) coordinates, information that identifies altitudes at one or more locations, and/or the like). For example, the UAV platform can provide the information associated with the route plan to the user device, as shown. As shown by reference number 118, the user device can configure UAV Y with the information associated with the route plan, and UAV Y can execute the route based on the route plan information.

In this way, the UAV platform can generate a route plan based on the parameters and using the RF model for predicting RF conditions in the 3D environment, thereby ensuring that RF conditions are such that an acceptable level of communication with UAV Y can be achieved as UAV Y travels at altitude in the 3D environment.

As indicated above, FIGS. 1A-1C are provided merely examples. Other examples are possible and can differ from what was described with regard to FIGS. 1A-1C.

Figure 2:
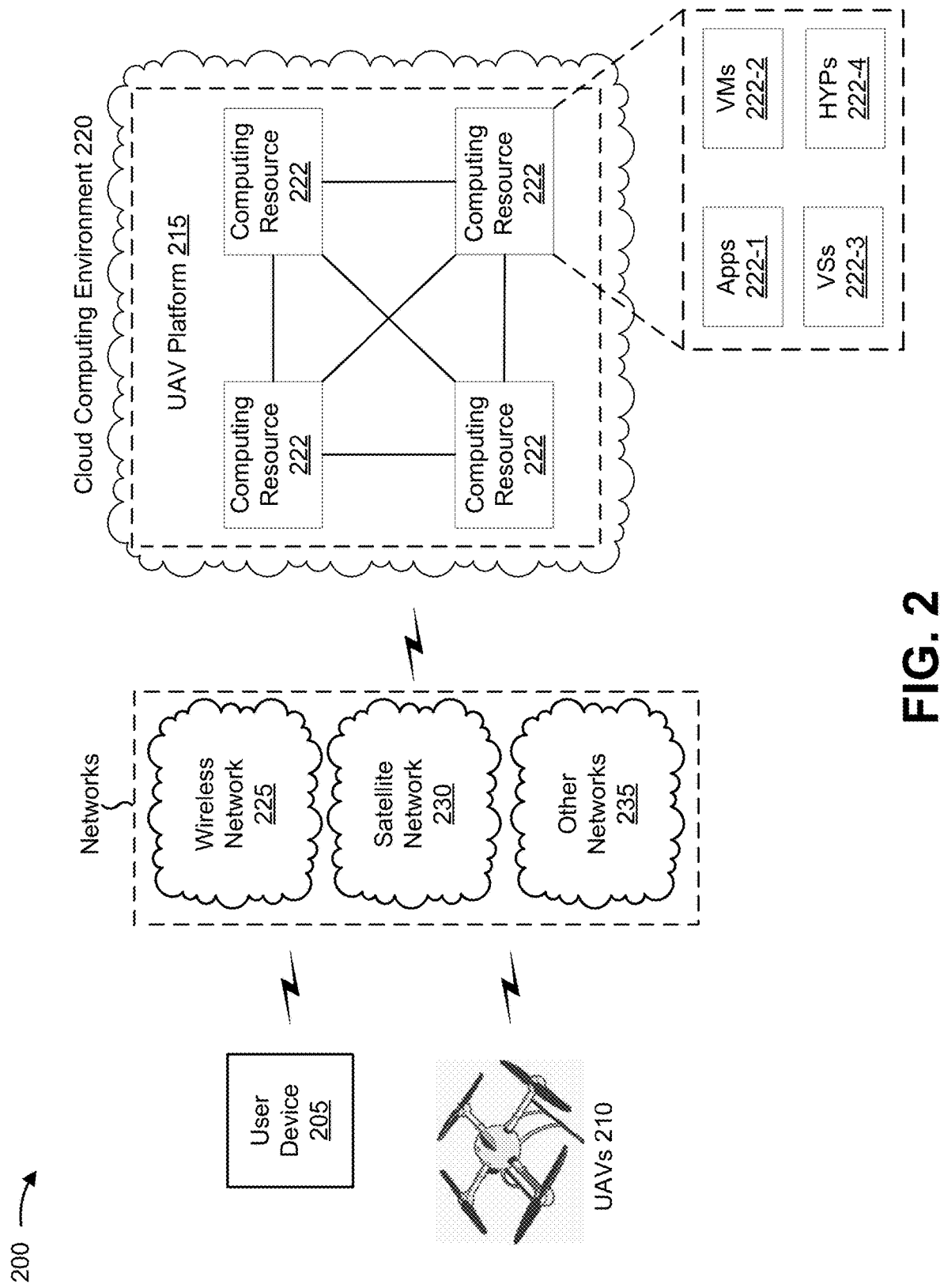
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, UAVs 210, a UAV platform 215 hosted in a cloud computing environment 220, a wireless network 225, a satellite network 230, and other networks 235. Devices of environment 200 can interconnect via wired connections, wireless connections, or a combination of wired and wireless connections.

User device 205 includes one or more devices capable of receiving, determining, storing, processing, and/or providing information associated with a route plan for UAV 210, such as information associated with one or more parameters based on which the route plan is to be generated, as described herein. For example, user device 205 can include a communication and computing device, such as a mobile phone (e.g., a smart phone, a radiotelephone, etc.), a laptop computer, a tablet computer, a handheld computer, a desktop computer, a wearable communication device (e.g., a smart wristwatch, a pair of smart eyeglasses, a sensor, etc.), or a similar type of device. In some implementations, user device 205 can be capable of receiving, from UAV platform 215, information associated with a route plan, and providing the information associated with the route plan to UAV platform 215 (e.g., such that UAV 210 can execute the route plan).

UAV 210 includes an aircraft without a human pilot aboard, and can also be referred to as an unmanned aircraft (UA), a drone, a remotely piloted vehicle (RPV), a remotely piloted aircraft (RPA), a remotely operated aircraft (ROA), and/or the like. In some implementations, UAV 210 can include a variety of shapes, sizes, configurations, characteristics, and/or the like, for a variety of purposes and applications. In some implementations, UAV 210 can include one or more sensors capable of measuring, detecting, and/or otherwise determining actual RF information at a given location, as described herein. In some implementations, UAV 210 can be capable of executing a route plan, associated with a route in a 3D environment, based on information provided by user device 205 and/or UAV platform 215.

In some implementations, UAV 210 can operate autonomously (e.g., without pilot control) using computational resources provided in UAV 210 (e.g., built-in control and/or guidance systems to perform low-level human pilot duties, such as speed and flight-path stabilization, scripted navigation functions, waypoint following, and/or the like). In some implementations, UAV 210 can include a variety of components, such as a power source (e.g., an internal combustion engine, an electric battery, a solar-powered battery, etc.), a component that generates aerodynamic lift force (e.g., a rotor, a propeller, a rocket engine, a jet engine, etc.), computational resources, one or more sensors, and/or the like.

In some implementations, UAV 210 can be controlled by UAV platform 215 and/or user device 205 via communications with UAV platform 215 and/or user device 205, respectively. Additionally, or alternatively, UAV 210 can be controlled by the computational resources of UAV 210. Additionally, or alternatively, UAV 210 can controlled by another UAV 210 via communications with the other UAV 210. Additionally, or alternatively, UAV 210 can be controlled by a combination of UAV platform 215, user device 205, the computational resources of UAV 210, and/or another other UAV 210.

UAV platform 215 includes one or more devices capable of generating an RF model associated with a 3D environment (e.g., based on predicted RF information associated with the 3D environment), updating the RF model (e.g., based on actual RF information associated with the 3D environment), and/or generating a route plan for UAV 210 using the RF model (e.g., based on one or more parameters provided by user device 205), as described herein. For example, UAV platform 215 can include a server or a collection of servers.

In some implementations, as shown, UAV platform 215 can be hosted in cloud computing environment 220. Notably, while implementations described herein describe UAV platform 215 as being hosted in cloud computing environment 220, in some implementations, UAV platform 215 is not cloud-based (i.e., can be implemented outside of a cloud computing environment) or can be partially cloud-based.

Cloud computing environment 220 includes an environment that delivers computing as a service, whereby shared resources, services, and/or the like, can be provided to UAV platform 215. Cloud computing environment 220 can provide computation, software, data access, storage, and/or other services that do not require end-user knowledge of a physical location and configuration of a system and/or a device that delivers the services. As shown, cloud computing environment 220 can include a group of computing resources 222 (referred to collectively as computing resources 222 and individually as computing resource 222).

Computing resource 222 includes one or more personal computers, workstation computers, server devices, or another type of computation and/or communication device. In some implementations, computing resource 222 can host UAV platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that can be provided to or accessed by user device 205. Application 222-1 can eliminate a need to install and execute the software applications on user device 205. For example, application 222-1 can include software associated with UAV platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user (e.g., user device 205), and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Wireless network 225 includes a wireless network, such as a fourth generation (4G) cellular network that includes an evolved packet system (EPS), a fifth generation (5G) cellular network (sometimes referred to as a new radio (NR) network), and/or the like. In some implementations, wireless network 225 can include a radio access network (e.g., referred to as a long term evolution (LTE) network in the context of 4G), a wireless core network (e.g., referred to as an evolved packet core (EPC) network in the context of 4G), an Internet protocol (IP) multimedia subsystem (IMS) network, and a packet data network (PDN). In some implementations, wireless network 225 can include base stations (e.g., cell towers), antennas of which create RF conditions in a 3D environment associated with wireless network 225, as described herein. In some implementations, UAV platform 215 can generate an RF model, associated with the 3D environment, based on antenna information associated with these antennas, as described herein. Additionally, or alternatively, wireless network 225 can include another type of network that allows for wireless communication, such as an optical network that allows for electro-optical communication.

Satellite network 230 includes a space-based satellite navigation system (e.g., a global positioning system (GPS)) that provides location and/or time information (e.g., in all weather conditions), on or near Earth where there is an unobstructed line of sight to four or more satellites (e.g., GPS satellites). In some implementations, satellite network 230 can provide location information (e.g., GPS coordinates) associated with UAV 210, enable communication with UAV 210, and/or the like.

Each of other networks 235 can include a network, such as a local area network (LAN), a wide area network (WAN), a metropolitan area network (MAN), a telephone network, such as the Public Switched Telephone Network (PSTN) or a cellular network, an intranet, the Internet, a fiber optic network, an optical network (e.g., a network that allows for electro-optical communication), a cloud computing network, or a combination of networks. In some implementations, one or more devices of environment 200 can communicate via one or more other networks 235.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
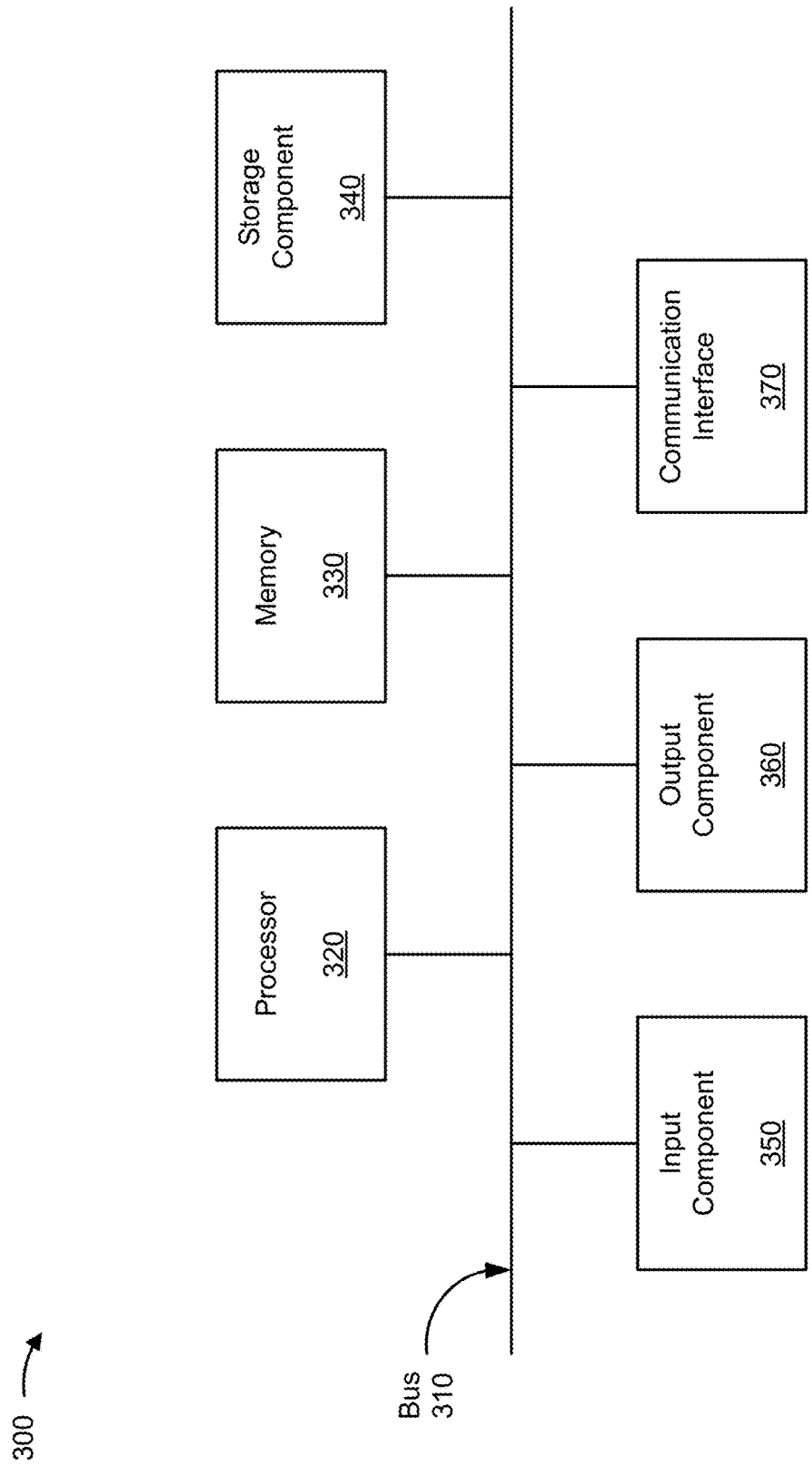
FIG. 3 is a diagram of example components of one or more devices of FIG. 2.

FIG. 3 is a diagram of example components of a device 300. Device 300 can correspond to user device 205, UAV 210, UAV platform 215, and/or computing resource 222. In some implementations, user device 205, UAV 210, UAV platform 215, and/or computing resource 222 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
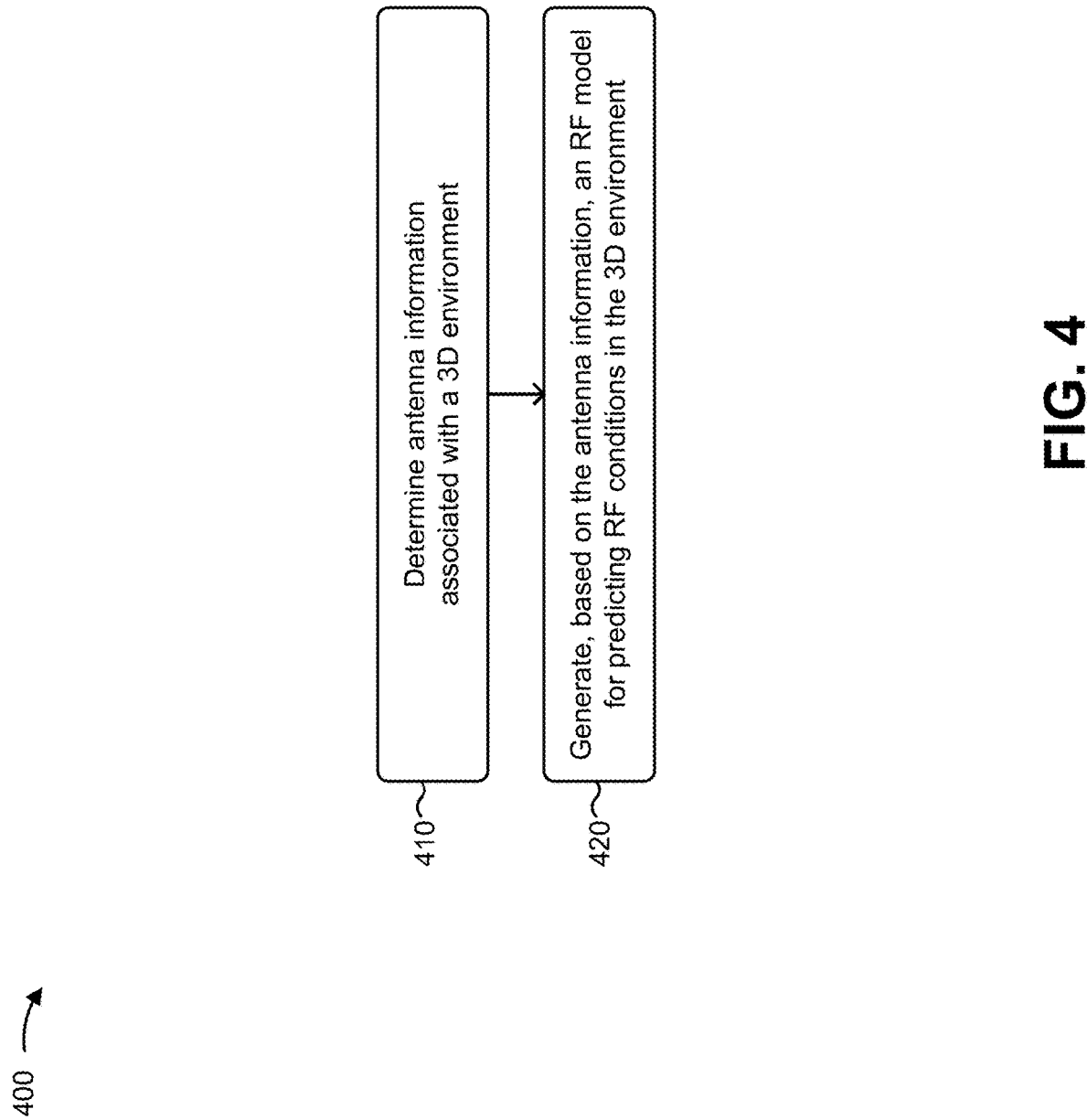
FIG. 4 is a flow chart of an example process for generating a radio frequency (RF) model for predicting RF conditions in a three-dimensional (3D) environment.

FIG. 4 is a flow chart of an example process 400 for generating an RF model for predicting RF conditions in a 3D environment. In some implementations, one or more process blocks of FIG. 4 can be performed by UAV platform 215. In some implementations, one or more process blocks of FIG. 4 can be performed by another device or a group of devices separate from or including UAV platform 215, such as user device 205.

As shown in FIG. 4, process 400 can include determining antenna information associated with a 3D environment (block 410). For example, UAV platform 215 can determine antenna information associated with the 3D environment.

The antenna information can include information associated with a property, a characteristic, a configuration, a setting, a parameter, and/or the like of one or more antennas (e.g., antennas of cell towers included in wireless network 225) associated with the 3D environment (e.g., the environment in which UAVs 210 can travel).

For example, the antenna information can include information that identifies an antenna, such as a name, an identification number, and/or the like. As another example, the antenna information can include information that identifies a location of the antenna, such as a latitude and a longitude, a set of global positioning system (GPS) coordinates, an altitude of the antenna, and/or the like.

As another example, the antenna information can include information that identifies an orientation of the antenna, such as information that identifies a direction in which one or more RF beams (sometimes referred to as lobes) are radiated by the antenna (e.g., a vertical angle with respect to ground level, a horizontal angle in a plane corresponding to ground level, and/or the like). As another example, the antenna information can include information that identifies a pattern associated with the antenna, such as number of RF beams radiated by the antenna, an arrangement of RF beams, and/or the like.

As another example, the antenna information can include information that identifies a frequency at which the antenna operations, an output power levels corresponding to the frequency, and/or the like.

In some implementations, UAV platform 215 can determine the antenna information based on receiving the antenna information from another device. For example, UAV platform 215 can receive the antenna information from one or more devices in wireless network 225 (e.g., one or more devices associated with configuring, operating, managing, and/or the like, antennas of cell towers in wireless network 225, such as a device configured to store and/or manage a database of antenna information). As another example, UAV platform 215 can receive the antenna information from user device 205. In some implementations, UAV platform 215 can receive the antenna information based on requesting the antenna information from the other device. Additionally, or alternatively, UAV platform 215 can receive the antenna information automatically (e.g., periodically, when a configuration of the antenna is modified, and/or the like).

Additionally, or alternatively, UAV platform 215 can determine the antenna information based on user input. For example, UAV platform 215 can determine the antenna information based on input from a user of user device 205 and/or UAV platform 215.

As further shown in FIG. 4, process 400 can include generating, based on the antenna information, an RF model for predicting RF conditions in the 3D environment (block 420). For example, UAV platform 215 can generate, based on the antenna information, an RF model for predicting RF conditions in the 3D environment.

In some implementations, UAV platform 215 can generate the RF model based on predicted RF information. The predicted RF information can include information that identifies a predicted RF condition within the 3D environment. For example, the predicted RF information can include information that identifies a predicted signal to interference plus noise ratio (SINR), a predicted signal to noise ratio (SNR), a predicted signal strength, a predicted reference signal received power (RSRP), a predicted reference signal received quality (RSRQ), and/or another type of metric that describes a predicted RF condition. As described in further detail below, a given item of predicted RF information can describe a predicted RF condition in a particular portion of the 3D environment, while the predicted RF information, when taken as a whole, can describe predicted RF conditions throughout the entire 3D environment.

In some implementations, UAV platform 215 can determine the predicted RF information based on the antenna information. For example, UAV platform 215 can derive a gain vector field, associated with a given antenna, based on an orientation of the antenna, a pattern associated with the antenna, an output power level of a frequency of the antenna, and/or the like. UAV platform 215 can then define a Gaussian surface at the antenna based on the gain vector field, and can calculate a range of each gain vector of the gain vector field based on, for example, a maximum allowable path loss. In some implementations, UAV platform 215 can perform this process for each antenna in the 3D environment (e.g., such that range-adjusted gain vectors are known for each antenna).

UAV platform 215 can then map these range-adjusted gain vectors in a representation of the 3D environment (e.g., based on latitudes and longitudes of the antennas, GPS coordinates of the antennas, altitudes of the antennas, and/or the like). In some implementations, the 3D environment can be represented by stacks of 3D spaces (e.g., spaces represented by cylinders, cubes, cuboids, and/or the like), where an area (e.g., a length times a width) covered by each stack corresponds to a two dimensional (2D) geographic area, and a thickness of each 3D space in a given stack corresponds to a respective range of altitudes at the 2D geographic area. In some implementations, an area associated with a given stack and/or ranges of altitudes associated with spaces of the given stack can be configurable on UAV platform 215 and/or automatically selected (e.g., based on a default configuration) by UAV platform 215 when generating the RF model. In some implementations, lengths, widths, and/or thicknesses of the 3D spaces can be uniform over the 3D environment. Alternatively, lengths, widths, and/or thicknesses of the 3D spaces can vary among the 3D spaces.

Continuing with this example, UAV platform 215 can determine the predicted RF information, associated with the 3D environment, based on mapping the range-adjusted gain vectors, associated with the antennas, to the representation of the 3D environment. For example, when UAV platform 215 is to generate a SINR-based model, UAV platform 215 can determine predicted RF information that includes information that identifies a predicted SINR in each 3D space in the stacks that represent the 3D environment. As a particular example, UAV platform 215 can determine the predicted SINR for a given 3D space by dividing a strongest range adjusted gain vector, mapped to the given 3D space, by a combined powers of other range-adjusted gain vectors mapped to the given 3D space. In some implementations, UAV platform 215 can perform similar calculations for each 3D space (e.g., such that a predicted SINR has been determined for each 3D space).

In some implementations, UAV platform 215 can generate, based on the predicted RF information, the RF model for predicting RF conditions in the 3D environment. For example, UAV platform 215 can generate a model that, upon receiving information that identifies a frequency and a particular location in the 3D environment as input (e.g., a set of GPS coordinates and an altitude), provides predicted RF information for the frequency at the particular location (e.g., by identifying predicted RF information for a 3D space that corresponds to the particular location).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5B:
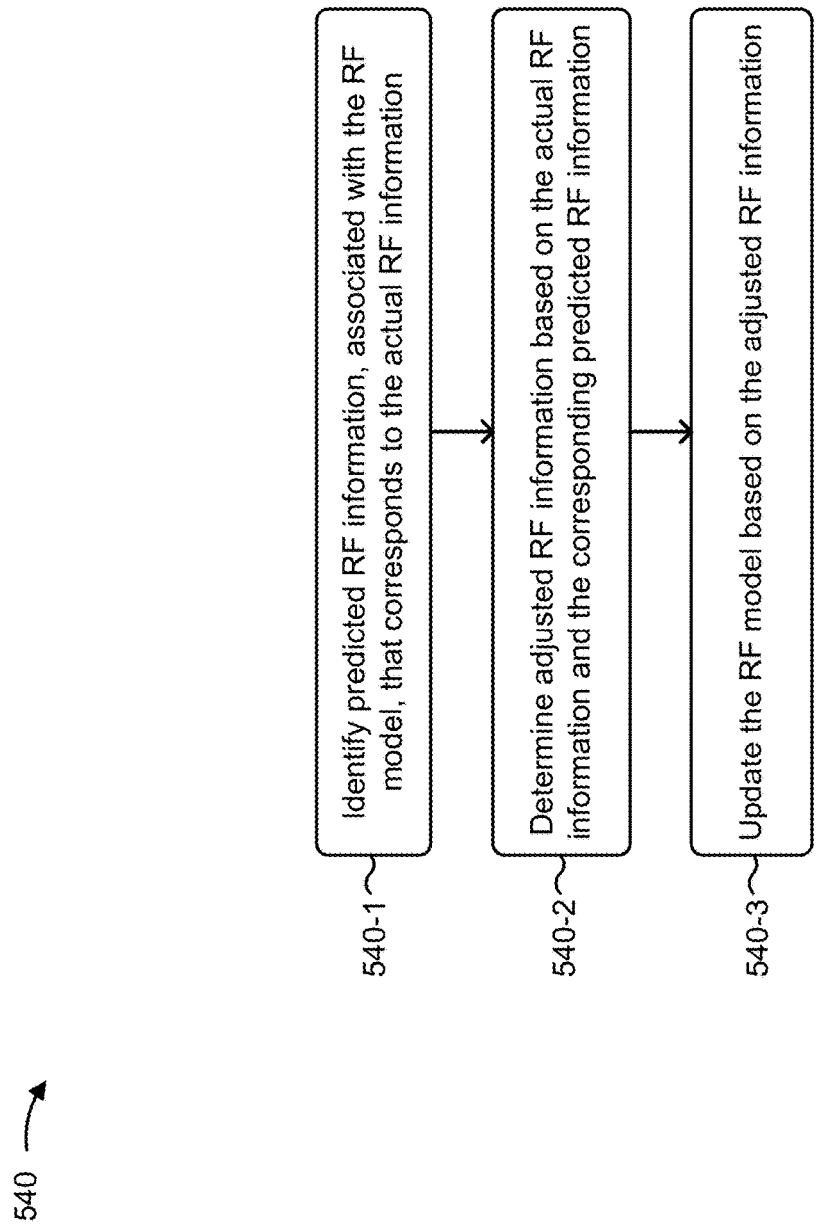

FIGS. 5A and 5B are flow charts associated with example process 500 for updating an RF model, associated with predicting RF conditions in a 3D environment, based on actual RF information associated with the 3D environment. In some implementations, one or more process blocks of FIG. 5A can be performed by UAV 210 or by UAV platform 215, as described below. In some implementations, one or more process blocks of FIG. 5A or 5B can be performed by another device or a group of devices separate from or including UAV platform 215, such by another device of environment 200.

As shown in FIG. 5A, process 500 can include measuring actual RF information associated with the 3D environment (block 510). For example, UAV 210 can measure actual RF information associated with the 3D environment.

The actual RF information can include information that identifies an actual RF condition within the 3D environment. For example, the actual RF information can include information that identifies an SINR at a particular location in the 3D environment, an actual SNR at a particular location in the 3D environment, an actual signal strength at a particular location in the 3D environment, an actual RSRP at a particular location in the 3D environment, an actual RSRQ at a particular location in the 3D environment, and/or another type of metric that describes an actual RF condition at a particular location in the 3D environment.

In some implementations, UAV 210 can measure the actual RF information when UAV 210 traverses the 3D environment. For example, UAV 210 can traverse the 3D environment on a route within the 3D environment, and can measure actual RF information at one or more locations along the route (e.g., using one or more sensors, antennas, and/or the like, of UAV 210). In some implementations, UAV 210 can associate location information (e.g., a latitude and a longitude, a set of GPS coordinates, an altitude, and/or the like) with a given item of actual RF information (e.g., such that a location at which the actual RF information was measured can be identified at a later time, as described below). Additionally, or alternatively, UAV 210 can associate a timestamp (e.g., a date and time) with a given item of actual RF information (e.g., such that a time at which the actual RF information was measured can be identified at a later time, as described below).

In some implementations, UAV 210 can measure the actual RF information during execution of a route (e.g., a flight) within the 3D environment. For example, UAV 210 can be configured (e.g., based on information provided by UAV platform 215 and/or user device 205) to execute a route on a particular path through or within the 3D environment. Here, UAV 210 can measure actual RF information at one or more locations (e.g., periodically based on a timer, at a set of particular locations, and/or the like) during execution of the route. In some implementations, such a flight can be a flight conducted for the purpose of measuring actual RF information. Additionally, or alternatively, such a flight can be a flight conducted for another purpose (e.g., delivering a package, filming a video, and/or the like), and UAV 210 can (e.g., automatically) measure the actual RF information (e.g., based on a default configuration of UAV 210).

As further shown in FIG. 5A, process 500 can include providing the actual RF information (block 520). For example, UAV 210 can provide the actual RF information.

In some implementations, UAV 210 can provide the actual RF information to UAV platform 215 so that UAV platform 215 can update an RF model associated with predicting RF conditions in the 3D environment, as described below.

In some implementations, UAV 210 can provide the actual RF information during execution of a route through or within the 3D environment (e.g., in real-time or near real-time, periodically during a flight, at particular times during a flight, and/or the like). Additionally, or alternatively, UAV 210 can provide the actual RF information after the flight (e.g., after executing the route).

In some implementations, UAV 210 can automatically provide the actual RF information. Additionally, or alternatively, UAV 210 can provide the actual RF information based on receiving a request from another device, such as UAV platform 215, user device 205, and/or the like.

As further shown in FIG. 5A, process 500 can include receiving the actual RF information (block 530). For example, UAV platform 215 receive the actual RF information after UAV 210 provides the actual RF information, as described above.

In some implementations, UAV platform 215 can receive actual RF information from one or more UAVs 210, where each UAV 210 provides actual RF information associated with a route executed by the UAV 210.

In some implementations, UAV platform 215 can receive the actual RF information based on the actual RF information being automatically provided by UAV 210, as described above. Additionally, or alternatively, UAV platform 215 can receive the actual RF information based on request the actual RF information from UAV 210, as described above.

As further shown in FIG. 5A, process 500 can include updating, based on the actual RF information, an RF model associated with predicting RF conditions in the 3D environment (block 540). For example, UAV platform 215 can update an RF model, associated with predicting RF conditions in the 3D environment, based on the actual RF information. FIG. 5B is a flow chart of an example sub-process 540 for updating the RF model based on the actual RF information.

As shown in FIG. 5B, sub-process 540 can include identifying predicted RF information, associated with the RF model, that corresponds to the actual RF information (block 540-1). For example, UAV platform 215 can identify predicted RF information, associated with the RF model, that corresponds to the actual RF information.

In some implementations, UAV platform 215 can identify the predicted RF information that corresponds to the actual RF information (herein referred to as corresponding predicted RF information) based on location information associated with the actual RF information. For example, a given item of actual RF information (e.g., a measured SINR) can be associated with a particular location (e.g., a latitude and a longitude, a set of GPS coordinates, an altitude, and/or the like), as described above. In this example, UAV platform 215 can map the location, associated with the item of actual RF information, to a corresponding 3D space representing a portion of the 3D environment, and can identify predicted RF information (e.g., a predicted SINR) corresponding to the 3D space. In other words, UAV platform 215 can identify predicted RF information for a portion of the 3D environment (e.g., a particular 3D space) in which the actual RF information was measured.

As further shown in FIG. 5B, sub-process 540 can include determining adjusted RF information based on the actual RF information and the corresponding predicted RF information (block 540-2). For example, UAV platform 215 can determine adjusted RF information based on the actual RF information and the corresponding predicted RF information.

The adjusted RF information can include predicted RF information that has been adjusted, updated, or otherwise modified based on actual RF information. In some implementations, UAV platform 215 can determine the adjusted RF information based on the predicted RF information and the actual RF information. For example, UAV platform 215 can identify predicted RF information (e.g., a predicted SINR), associated with a particular 3D space, that corresponds to actual RF information (e.g., an actual SINR), measured at a particular location, as described above. Here, UAV platform 215 can calculate an average of the predicted RF information the actual RF information, a result of which is the adjusted RF information (e.g., an adjusted predicted SINR for the 3D space).

In some implementations, UAV platform 215 can determine the adjusted RF information based on calculating a weighted average of the actual RF information and/or the corresponding predicted RF information (e.g., by applying a weight factor to the predicted RF information and/or the actual RF information). In some implementations, an amount of weight given to the actual RF information and/or the predicted RF information can be based on a time at which the actual RF information was measured (e.g., such that new measurements can be given more weight), a difference between the predicted RF information and the actual RF information (e.g., such that possibly anomalous measurements can be given less weight), an exact location within the 3D space at which the actual RF information was measured (e.g., such that actual RF information measured closer to a center of the 3D space can be given more weight), and/or the like.

In some implementations, UAV platform 215 can determine the adjusted RF information based on the predicted RF information and multiple items of actual RF information (e.g., when multiple measurements are taken within the same 3D space). In such a case, UAV platform 215 can give each item of actual RF information a different amount of weight (e.g., such that newer measurements have more weight than older measurements) when determining he adjusted RF information.

In some implementations, UAV platform 215 can determine adjusted RF information for one or more 3D spaces for which UAV platform 215 has received actual RF information. For example, UAV platform 215 can map one or more items of actual RF information to multiple 3D spaces, identify predicted RF information for each of the multiple 3D spaces, and can determine adjusted RF information for each of the 3D spaces (e.g., based on the associated items of actual RF information).

As further shown in FIG. 5B, sub-process 540 can include updating the RF model based on the adjusted RF information (block 540-3). For example, UAV platform 215 can update the RF model based on the adjusted RF information.

In some implementations, UAV platform 215 can update the RF model by updating predicted RF information based on the adjusted RF information. For example, UAV platform 215 can determine adjusted RF information corresponding to a given 3D space, as described above. In this example, UAV platform 215 can update the RF model by overwriting and/or replacing the predicted RF information (e.g., determined as described above with regard to process 400), with the adjusted RF information. In some implementations, UAV platform 215 can updated multiple items of predicted RF information, corresponding to multiple 3D spaces associated with the RF model, based on multiple corresponding items of adjusted RF information.

In this way, UAV platform 215 can update the RF model based on actual RF information, thereby improving accuracy of the RF model when generating a route plan using the RF model, as described below.

Although FIGS. 5A and 5B show example blocks of process 500, in some implementations, process 500 can include additional blocks, fewer blocks, different blocks, or differently arranged blocks than those depicted in FIGS. 5A and 5B. Additionally, or alternatively, two or more of the blocks of process 500 can be performed in parallel.

Figure 6A:
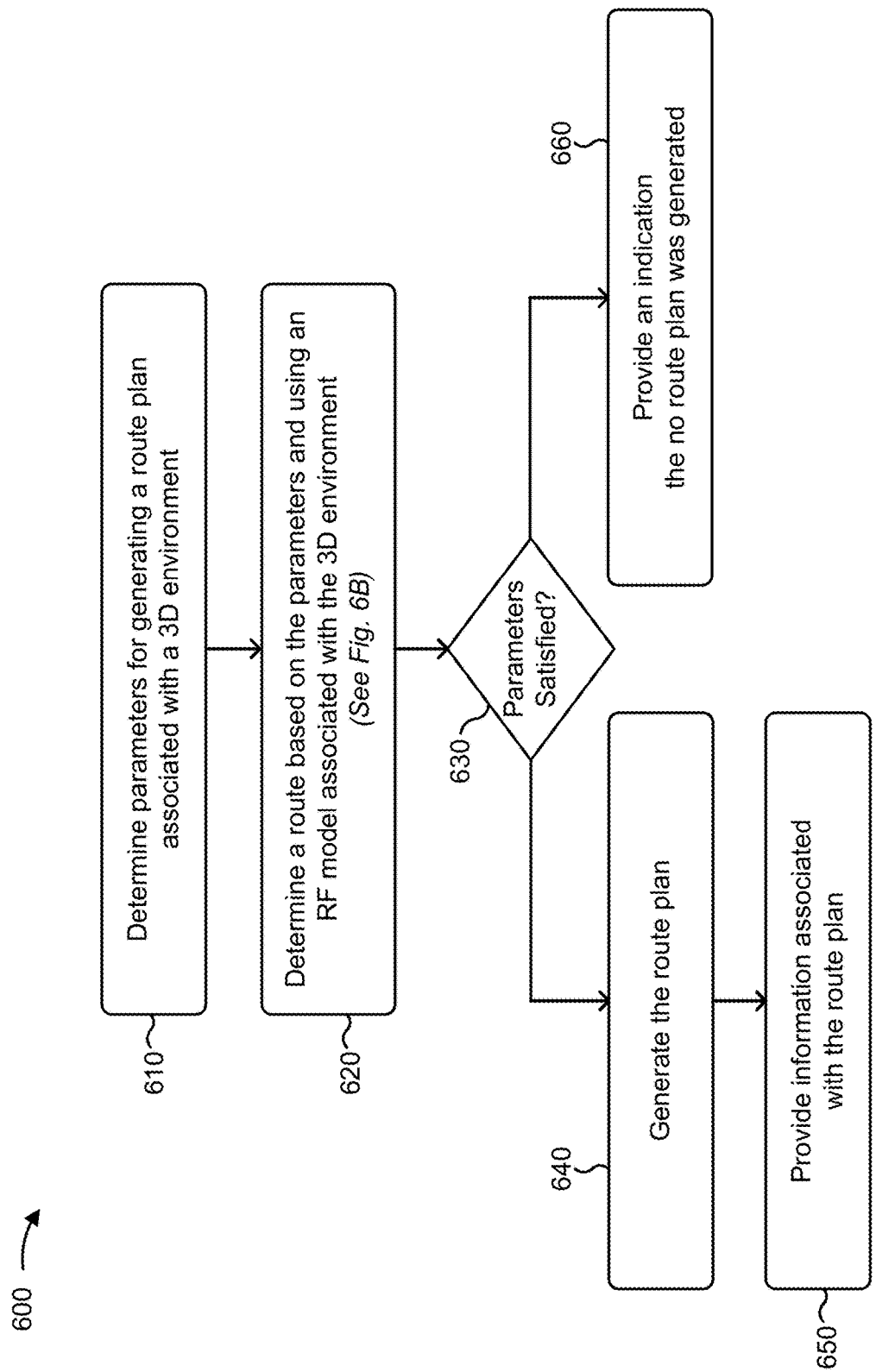

FIGS. 6A and 6B are flow charts associated with example process 600 for generating a route plan using an RF model associated with a 3D environment. In some implementations, one or more process blocks of FIGS. 6A and 6B can be performed by UAV platform 215. In some implementations, one or more process blocks of FIG. 6A or 6B can be performed by another device or a group of devices separate from or including UAV platform 215, such by user device 205 and/or another device of environment 200.

As shown in FIG. 6A, process 600 can include determining parameters for generating a route plan associated with a 3D environment (block 610). For example, UAV platform 215 can determine parameters for generating a route plan associated with a 3D environment.

The parameters can include one or more requirements, factors, guidelines, rules, and/or the like, based on which a route plan (e.g., a route plan that defines a flight path of UAV 210 through or within the 3D environment) is to be generated.

For example, the parameters can include a quality of service parameter, such as an RF condition parameter (e.g., a minimum SINR, a minimum SNR, a minimum signal strength, a minimum RSRP, a minimum RSRQ, and/or the like), a throughput parameter (e.g., a minimum throughput of 1 megabit per second (Mbps)), and/or the like. As another example, the parameters can include a service type parameter (e.g., 720p video resolution, high quality audio, and/or the like).

As another example, the parameters can include a routing parameter, such as information that identifies a start location of the route, information that identifies an end location of the route, information that identifies one or more waypoints along the route, information that identifies a minimum and/or a maximum altitude that is permitted along the route, information that identifies a minimum and/or a maximum route length, and/or the like.

As another example, the parameters can include a user device parameter, such as information that identifies a capability of user device 205 (e.g., information that identifies a frequency band on which user device 205 is capable of communicating), information that identifies one or more frequency bands permitted for use by user device 205 (e.g., a personal communications service (PCS) band, an advanced wireless service (AWS) band, and/or the like).

As another example, the parameters can include a UAV parameter, such as information that identifies a capability of UAV 210 (e.g., information that identifies a frequency band on which UAV 210 is capable of communicating), information that identifies one or more frequency bands permitted for use by UAV 210 (e.g., a personal communications service (PCS) band, an advanced wireless service (AWS) band, and/or the like), information that identifies a minimum and/or a maximum altitude at which UAV 210 can travel, information that identifies a maximum range of UAV 210, and/or the like.

As another example, the parameters can include a preference-related parameter. An example of a preference-related parameter can include a parameter indicating whether a shorter route with comparatively worse RF conditions is preferred over a longer route with comparatively better RF conditions. This parameter can be useful when, for example, a user of user device 205 wishes to reduce cellular data usage when communicating with UAV 210 during the route (e.g., since less cellular data can be used along the shorter route). Another example of a preference-related parameter is a parameter indicating whether a route with fewer altitude shifts is preferred over a route with more altitude shifts. This parameter can be useful when, for example, a user of user device 205 wishes to reduce power consumption of UAV 210 during execution of the route.

As another example, the parameters can include an unmanned traffic management (UTM) parameter, such as a parameter that identifies a portion of the 3D environment in which UAV 210 is not permitted to travel (e.g., restricted airspace), a parameter that identifies a portion of the 3D environment in which another UAV 210 is scheduled to execute a route, and/or the like.

In some implementations, UAV platform 215 can determine the parameters based on based on user input. For example, a user of user device 205 can provide information associated with the parameters as input to user device 205, and user device 205 can provide the parameters to UAV platform 215 (e.g., when user device 205 sends a request to UAV platform 215 associated with generating a route plan).

Additionally, or alternatively, UAV platform 215 can determine the parameters based on information provided by another device (e.g., based on request provided by UAV platform 215, based on being automatically provided by the other device, and/or the like) and/or based on information stored or accessible by UAV platform 215.

In some implementations, UAV platform 215 can determine the parameters based on receiving (e.g., from user device 205) a request to generate a route plan for UAV 210. For example, UAV platform 215 can receive, from user device 205, information associated with the parameters along with a request to generate a route plan for UAV 210.

As further shown in FIG. 6A, process 600 can include determining a route based on the parameters and using an RF model associated with the 3D environment (block 620). For example, UAV platform 215 can determine a route based on the parameters and using an RF model associated with the 3D environment. FIG. 6B is a flow chart of an example sub-process 620 for determining the route based on the parameters and the RF model associated with the 3D environment.

As shown in FIG. 6B, sub-process 620 can include identifying a set of 3D spaces associated with generating the route plan (block 620-1). For example, UAV platform 215 can identify a set of 3D spaces associated with determining the route. In some implementations, UAV platform 215 can identify the set of 3D spaces for which UAV platform 215 has determined predicted RF information and/or adjusted RF information, as described above. In other words, UAV platform 215 can identify a set of 3D spaces, associated with the RF model generated by UAV platform 215, that represent the 3D environment through or within which UAV 210 is to be routed. In some implementations, UAV platform 215 can identify the set of 3D spaces based on information stored or accessible by UAV platform 215 (e.g., based on the RF model being stored or accessible by UAV platform 215).

As further shown in FIG. 6B, sub-process 620 can include identifying, based on the parameters, candidate 3D spaces included in the set of 3D spaces (block 620-2). For example, UAV platform 215 can identify, based on the parameters, a set of candidate 3D spaces of the set of 3D spaces.

The set of candidate 3D spaces can include 3D spaces through which UAV 210 can be routed when taking into account one or more of the parameters based on which the route plan is to be generated. In some implementations, UAV platform 215 can identify the set of candidate 3D spaces based on information associated with a given 3D space, of the set of 3D spaces, and one or more parameters.

For example, based on the parameters and information associated with the set of 3D spaces, UAV platform 215 can identify 3D spaces, of the set of 3D spaces, that are at or above a minimum altitude permitted along the route, at or below a maximum altitude permitted along the route, and/or the like. From these 3D spaces, UAV platform 215 can eliminate any 3D spaces based on a UTM parameter (e.g., 3D spaces in restricted airspace). Of the remaining 3D spaces, UAV platform 215 can identify those for which an RF condition parameter is satisfied (e.g., based on information associated with the RF model). In some implementations, UAV platform 215 can identify the 3D spaces for which the RF condition is satisfied based on predicted RF information and/or adjust RF information associated with the RF model. As a particular example, when the RF condition parameter identifies a minimum SINR, UAV platform 215 can identify 3D spaces with a predicted SINR or an adjusted SINR (if available) that meets or exceeds the minimum SINR. In this example, the candidate 3D spaces are the 3D spaces with the predicted SINR or adjusted SINR that meets or exceeds the minimum SINR. In this way, UAV platform 215 can identify a set of candidate 3D spaces based on one or more parameters and information associated with the RF model.

Notably, the above example is provided for illustrative purposes, and other examples are possible. For example, UAV platform 215 can identify the set of candidate 3D spaces based on one or more other, additional, and/or different parameters; by eliminating 3D spaces in a different order based on one or more parameters; and/or the like.

As further shown in FIG. 6B, sub-process 620 can include determining the route based on the candidate 3D spaces (block 620-3). For example, UAV platform 215 can determine the route based on the candidate 3D spaces. In some implementations, UAV platform 215 can determine the route based on a path-planning algorithm that finds a path through the candidate 3D spaces, such as Dijkstra's algorithm, the A* algorithm, the D* algorithm, a rapidly-exploring random tree (RRT), and/or the like.

In some implementations, UAV platform 215 can determine a single route based on the candidate 3D spaces. For example, UAV platform 215 can be configured to determine a single route based on the candidate 3D spaces, such as a shortest route, a route with a best average SINR, and/or the like.

Additionally, or alternatively, UAV platform 215 can determine a multiple routes based on the candidate 3D spaces (e.g., the three shortest routes, the five routes with the best SINR, and/or the like). In some implementations, when UAV platform 215 determines multiple routes, UAV platform 215 can generate a score for each of the multiple routes (e.g., a value from 0 to 100, a letter grade from A to F, and/or the like).

In some implementations, UAV platform 215 can calculate a score for a given route based on a (e.g., weighted) combination of factors associated with the given route, such as an average RF condition along the route, a route length, an amount of altitude shift along the route, and/or the like. In some implementations, the score can be calculated based on a preference-related parameter (e.g., such that a relatively higher score is calculated for a route with fewer altitude shifts when such rotes are preferred).

Returning to FIG. 6A, process 600 can include determining whether the parameters, associated with generating the route plan, are satisfied (block 630). For example, UAV platform 215 can determine whether the parameters, associated with generating the route plan, are satisfied.

In some implementations, UAV platform 215 can determine whether the parameters are satisfied based on the parameters and information associated with the route. For example, if the parameters identify a maximum route length, then UAV platform 215 can determine whether one or more of the determined routes have a length that is less than or equal to the maximum route length (e.g., within a threshold length). As another example, if the parameters identify a maximum range of UAV 210, then UAV platform 215 can determine whether one or more of the determined routes have a length that is less than or equal to the maximum range of UAV 210.

Notably, the above examples are provided for illustrative purposes, and other examples are possible. For example, UAV platform 215 can determine whether one or more other, additional, and/or different parameters are satisfied than those described above.

As further shown in FIG. 6A, if the parameters are satisfied, then process 600 can include generating the route plan (block 640). For example, if UAV platform 215 determines that the parameters are satisfied, then UAV platform 215 can generate the route plan.

The route plan can include information based on which UAV 210 can execute the route. For example, the route plan can include sets of latitudes and longitudes, sets of GPS coordinates, information that identifies way points along the route, information that identifies altitudes at one or more locations and/or waypoints along the route, and/or the like. In some implementations, the route plan can include information associated with multiple routes (e.g., such that the user can select one of the multiple routes).

In some implementations, UAV platform 215 can generate the route plan based on information associated with the 3D spaces along the route determined by UAV platform 215. For example, UAV platform 215 can generate the route plan based on information that describes geographic areas associated with 3D spaces along the route, information that describes respective ranges of altitudes at the geographic areas associated with the 3D spaces along the route, and/or the like. In other words, UAV platform 215 can generate the route plan such that UAV 210 can navigate through or within the 3D spaces along the determined route.

As further shown in FIG. 6A, process 600 can include providing information associated with the route plan (block 650). For example, UAV platform 215 can provide information associated with the route plan.

In some implementations, UAV platform 215 can provide the information associated with the route plan to user device 205 (e.g., such that a user can review the information associated with the route or select one of multiple routes identified by the route plan, such that user device 205 can configure UAV 210 with the route plan and cause UAV 210 to execute the route, and/or the like). Additionally, or alternatively, UAV platform 215 can provide the information associated with the route plan to UAV 210 (e.g., such that UAV platform 215 can automatically configure UAV 210 with the route and/or automatically cause UAV 210 to execute the route).

Alternatively, as further shown in FIG. 6A, if the parameters are not satisfied, then process 600 can include providing an indication that no route plan was generated (block 660). For example, if UAV platform 215 determines that the parameters are not satisfied, then UAV platform 215 can provide an indication that no route plan was generated.

In some implementations, UAV platform 215 can provide the indication to user device 205. In some implementations, the indication can include information that identifies one or more parameters that were not satisfied, a degree to which the one or more parameters were not satisfied (e.g., an amount by which a route length exceeded a maximum route length), and/or the like. In this way, the user can be informed that no route plan was generated (e.g., such that the user can consider altering one or more of the parameters).

Although FIGS. 6A and 6B show example blocks of process 600, in some implementations, process 600 can include additional blocks, fewer blocks, different blocks, or differently arranged blocks than those depicted in FIGS. 6A and 6B. Additionally, or alternatively, two or more of the blocks of process 600 can be performed in parallel.

Some implementations described herein provide UAV platform 215 capable of generating an RF model for predicting RF conditions in a 3D environment, and generating a route plan using the RF model. In some implementations, UAV platform 215 can generate the RF model based on predicted RF information associated with the 3D environment, and can update the RF model (e.g., at a later time) based on actual RF information associated with the 3D environment. In some implementations, generating the route plan based on the RF model ensures that RF conditions during execution of the route are capable of facilitating an acceptable level of communication with UAV 210 as UAV 210 travels at altitude in the 3D environment.

The foregoing disclosure provides illustration and description, but is not intended to be exhaustive or to limit the implementations to the precise form disclosed. Modifications and variations are possible in light of the above disclosure or can be acquired from practice of the implementations.

For example, in addition to being used for generating a route plan through a 3D environment, the RF model can be used for another purposes, such as aerial RF planning. Conventionally, RF conditions, and the associated coverage maps, have been designed with an orientation towards ground level (i.e., in order to provide terrestrial coverage), as described below. However, the RF model described herein can be used for designing RF conditions (e.g., cell tower and/or antenna planning) at altitude in order to improve, for example, RF conditions in a frequently used flight path, a frequently requested flight path, an area with poor RF conditions, and/or the like, thereby improving aerial RF coverage for the purpose of UAV routing.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive, from a plurality of antennas, antenna information associated with a three-dimensional (3D) environment;
generate, based on receiving the antenna information, a radio frequency (RF) model that predicts one or more RF conditions in the 3D environment;
receive, from a first unmanned aerial vehicle (UAV), one or more actual RF conditions measured by the first UAV while traversing the 3D environment;
determine adjusted RF information based on calculating a weighted average of the one or more actual RF conditions and the predicted one or more RF conditions;
update the RF model based on the adjusted RF information;
determine a set of parameters associated with generating a route plan for routing a second UAV in the 3D environment,
wherein the set of parameters includes a parameter that identifies an RF condition to be satisfied to generate the route plan;
determine a route, associated with the 3D environment, based on the parameter and using the updated RF model;
generate the route plan including information associated with the route; and
provide information associated with the route plan, the second UAV to execute the route plan based on the information.

2. The device of claim 1, wherein the parameter identifies at least one of:
a minimum signal to interference plus noise ratio (SINR);
a minimum signal to noise ratio (SNR);
a minimum signal strength;
a minimum reference signal received power (RSRP); or
a minimum reference signal received quality (RSRQ).

3. The device of claim 1, wherein the one or more processors are further to:
determine, based on the antenna information, predicted RF information associated with the 3D environment; and
wherein the one or more processors, when generating the RF model, are to:
generate the RF model based on the predicted RF information.

4. The device of claim 1, wherein the one or more processors are further to:
identify predicted RF information, associated with the RF model, that corresponds to the one or more actual RF conditions; and
determine adjusted RF information based on the one or more actual RF conditions and the predicted RF information that corresponds to the one or more actual RF conditions; and
wherein the one or more processors, when updating the RF model, are to:
update the RF model based on the adjusted RF information.

5. The device of claim 1, wherein the one or more processors are further to:
identify a set of 3D spaces associated with determining the route; and
identify, based on the parameter and predicted RF information associated with the set of 3D spaces, candidate 3D spaces included in the set of 3D spaces; and
wherein the one or more processors, when determining the route, are to:
determine the route based on the candidate 3D spaces.

6. The device of claim 1, wherein the one or more processors are further to:
determine whether one or more parameters, of the set of parameters, are satisfied by the route; and
wherein the one or more processors, when generating the route plan, are to:
generate the route plan based on determining that the one or more parameters are satisfied by the route.

7. The device of claim 1, wherein the one or more processors, when providing the information associated with the route plan, are to:
provide one or more of:

information that identifies sets of latitudes and longitudes,
information associated with sets of global positioning system (GPS) coordinates, or
information that identifies altitudes at one or more locations.

8. The device of claim 1, wherein the RF model is a signal to interference plus noise ratio (SINR)-based model, and wherein the one or more processors, when generating the RF model, are to:
calculate one or more range-adjusted gain vectors associated with the plurality of antennas based on the antenna information,
map the one or more range-adjusted gain vectors in a representation of the 3D environment, and
generate the RF model based on the lapping.

9. A non-transitory computer-readable medium storing instructions, the instructions comprising:
one or more instructions that, when executed by one or more processors, cause the one or more processors to:
receive, from a plurality of antennas, antenna information associated with a three-dimensional (3D) environment;
generate, based on receiving the antenna information, a radio frequency (RF) model that predicts one or more RF conditions in the 3D environment;
receive, from a first unmanned aerial vehicle (UAV), one or more actual RF conditions measured by the first UAV while traversing the 3D environment;
determine adjusted RF information based on calculating a weighted average of the one or more actual RF conditions and the predicted one or more RF conditions;
update the RF model based on the adjusted RF information;
determine a set of parameters associated with generating a route plan for routing a second UAV in the 3D environment,
wherein the set of parameters includes a parameter that identifies an RF condition to be satisfied to generate the route plan;
determine a route, associated with the 3D environment, based on the parameter and using the updated RF model;
generate the route plan including information associated with the route; and
provide information associated with the route plan, the second UAV to execute the route plan based on the information.

10. The non-transitory computer-readable medium of claim 9, wherein the parameter identifies at least one of:
a minimum signal to interference plus noise ratio (SINR);
a minimum signal to noise ratio (SNR);
a minimum signal strength;
a minimum reference signal received power (RSRP); or
a minimum reference signal received quality (RSRQ).

11. The non-transitory computer-readable medium of claim 9, wherein the one or more instructions, when executed by the one or more processors, further cause the one or more processors to:
determine, based on the antenna information, predicted RF information associated with the 3D environment; and
wherein the one or more instructions, that cause the one or more processors to generate the RF model, cause the one or more processors to:
generate, based on the predicted RF information, the RF model.

12. The non-transitory computer-readable medium of claim 9, wherein the one or more instructions, when executed by the one or more processors, further cause the one or more processors to:
identify predicted RF information, associated with the RF model, that corresponds to the one or more actual RF conditions; and
determine adjusted RF information based on the one or more actual RF conditions and the predicted RF information that corresponds to the one or more actual RF conditions; and
wherein the one or more instructions, that cause the one or more processors to update the RF model, cause the one or more processors to:
update the RF model based on the adjusted RF information.

13. The non-transitory computer-readable medium of claim 9, wherein the one or more instructions, when executed by the one or more processors, further cause the one or more processors to:
identify a set of 3D spaces associated with determining the route; and
identify, based on the parameter and predicted RF information associated with the set of 3D spaces, candidate 3D spaces included in the set of 3D spaces; and
wherein the one or more instructions, that cause the one or more processors to determine the route, cause the one or more processors to:
determine the route based on the candidate 3D spaces.

14. The non-transitory computer-readable medium of claim 9, wherein the one or more instructions, when executed by the one or more processors, further cause the one or more processors to:
determine whether one or more parameters, of the set of parameters, are satisfied by the route; and
wherein the one or more instructions, that cause the one or more processors to generate the route plan, cause the one or more processors to:
generate the route plan based on determining that the one or more parameters are satisfied by the route.

15. The non-transitory computer-readable medium of claim 9, wherein the RF model is a minimum signal to interference plus noise ratio (SINR)-based model; and
wherein the one or more instructions, that cause the one or more processors to generate the RF model, cause the one or more processors to:
calculate one or more range-adjusted gain vectors associated with the plurality of antennas based on the antenna information,
map the one or more range-adjusted gain vectors in a representation of the 3D environment, and
generate the RF model based on the mapping.

16. A method, comprising:
receiving, by one or more devices and from a plurality of antennas, antenna information associated with a three-dimensional (3D) environment;
generating, by the one or more devices and based on receiving the antenna information, a radio frequency (RF) model that predicts one or more RF conditions in the 3D environment;
receiving, by the one or more devices and from a first unmanned aerial vehicle (UAV), one or more actual RF conditions measured by the first UAV while traversing the 3D environment;

determining, by the one or more devices, adjusted RF information based on calculating a weighted average of the one or more actual RF conditions and the predicted one or more RF conditions;

updating, by the one or more devices, the RF model based on the adjusted RF information;

determining, by the one or more devices, a set of parameters associated with generating a route plan for routing a second UAV in the 3D environment,
  wherein the set of parameters includes a parameter that identifies an RF condition to be satisfied to generate the route plan;

determining, by the one or more devices, a route, associated with the 3D environment, based on the parameter and using the updated RF model;

generating, by the one or more devices, the route plan including information associated with the route; and providing, by the one or more devices, information associated with the route plan,
  the second UAV to execute the route plan based on the information.

17. The method of claim 16, wherein the parameter identifies at least one of:
  a minimum signal to interference plus noise ratio (SINR);
  a minimum signal to noise ratio (SNR);
  a minimum signal strength;
  a minimum reference signal received power (RSRP); or
  a minimum reference signal received quality (RSRQ).

18. The method of claim 16, further comprising:
  determining, based on the antenna information, predicted RF information associated with the 3D environment; and
  wherein generating the RF model comprises:
    generating, based on the predicted RF information, the RF model.

19. The method of claim 16, further comprising:
  identifying predicted RF information, associated with the RF model, that corresponds to the one or more actual RF conditions; and
  determining adjusted RF information based on the one or more actual RF conditions and the predicted RF information that corresponds to the one or more actual RF conditions; and
  wherein updating the RF model comprises:
    updating the RF model based on the adjusted RF information.

20. The method of claim 16, further comprising:
  identifying a set of 3D spaces associated with determining the route; and
  identifying, based on the parameter and predicted RF information associated with the set of 3D spaces, candidate 3D spaces included in the set of 3D spaces; and
  wherein determining the route comprises:
    determining the route based on the candidate 3D spaces.

21. The method of claim 16, wherein the RF model is a minimum signal to interfere plus noise ratio (SINR)-based model, and
  wherein generating the RF model comprises:
    calculating one or more range-adjusted gain vectors associated with the plurality of antennas based on the antenna information,
    mapping the one or more range-adjusted gain vectors in a representation of the 3D environment, and
    generating the RF model based on the mapping.

* * * * *